US012785208B2

(12) United States Patent
Coppola et al.

(10) Patent No.: US 12,785,208 B2
(45) **Date of Patent: *Nov. 3, 2026**

(54) BATTERY CELL ARRAY TO PACK THERMAL RUNAWAY GAS VENTING SYSTEM USING MID PACK CHANNEL SYSTEM

(71) Applicant: GM GLOBAL TECHNOLOGY OPERATIONS LLC, Detroit, MI (US)

(72) Inventors: Anthony Michael Coppola, Rochester Hills, MI (US); Ryan Patrick Hickey, Austin, TX (US); Mohammad Hamza Kirmani, Troy, MI (US); William Thomas Kucinski, Windsor (CA); Michael Victor Pyrtko, Ferndale, MI (US); Kyle James Clare, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 596 days.

This patent is subject to a terminal disclaimer.

(21) Appl. No.: 18/331,509

(22) Filed: Jun. 8, 2023

(65) Prior Publication Data

US 2024/0413474 A1 Dec. 12, 2024

(51) Int. Cl.

*H01M 50/358* (2021.01)
*H01M 10/48* (2006.01)

(Continued)

(52) U.S. Cl.

CPC ......... *H01M 50/358* (2021.01); *H01M 10/48* (2013.01); *H01M 10/613* (2015.04);

(Continued)

(58) Field of Classification Search

CPC .. H01M 10/48; H01M 10/613; H01M 10/625; H01M 10/6556; H01M 10/6557;

(Continued)

(56) References Cited

U.S. PATENT DOCUMENTS

2005/0147874 A1 7/2005 Andersen et al.
2016/0093935 A1 3/2016 Obasih et al.

(Continued)

FOREIGN PATENT DOCUMENTS

DE 102021112231 A1 11/2022
DE 102021214245 A1 6/2023

(Continued)

OTHER PUBLICATIONS

Hickey, Ryan Patrick et al., U.S. Appl. No. 17/888,594, filed Aug. 16, 2022 entitled "Ventilation System for a Vehicle Battery," 21 pages.

(Continued)

*Primary Examiner* — Victoria H Lynch

(57) ABSTRACT

A battery pack for a vehicle includes a housing including at least one pack vent between an interior and an exterior of the housing. A plurality of battery cells are disposed within the housing. A channel system includes channel arrays positioned in connection with vents on each of the plurality of battery cells and the channel arrays are in connection with a master channel that communicates with the at least one pack vent, wherein the channel system is enclosed from the rest of the volume of the pack.

20 Claims, 6 Drawing Sheets

(51) Int. Cl.

| | |
|---|---|
| ***H01M 10/613*** | (2014.01) |
| ***H01M 10/6556*** | (2014.01) |
| ***H01M 50/121*** | (2021.01) |

(52) U.S. Cl.
CPC ..... *H01M 10/6556* (2015.04); *H01M 50/121* (2021.01); *H01M 2220/20* (2013.01)

(58) Field of Classification Search
CPC ......... H01M 10/6563; H01M 10/6566; H01M 2220/20; H01M 50/121; H01M 50/213; H01M 50/249; H01M 50/358; Y02E 60/10
See application file for complete search history.

(56) References Cited

U.S. PATENT DOCUMENTS

2016/0197324 A1* 7/2016 DeKeuster .......... H01M 50/571 429/82
2019/0006650 A1 1/2019 Bryla
2021/0218079 A1 7/2021 Juzkow et al.
2022/0367966 A1* 11/2022 Haemmerle ........ H01M 10/613
2023/0275285 A1 8/2023 Keum et al.
2023/0344070 A1* 10/2023 Kojc ................. H01M 10/6556
2024/0128583 A1 4/2024 Georgiadis
2024/0217351 A1* 7/2024 Mitchell-Downie .... A62C 3/16
2025/0385383 A1* 12/2025 Rhim .................. H01M 50/367

FOREIGN PATENT DOCUMENTS

EP 4156382 A1 3/2023
GB 2613184 A * 5/2023 ........ H01M 50/3425

OTHER PUBLICATIONS

Office Action issued in corresponding German Patent Application 102023133320.8 dated May 3, 2024.
Wang, Daniel M., et al., U.S. Appl. No. 18/326,186, filed May 31, 2023 entitled “Battery Cell Support Assembly with Integrated Thermal Runaway Mitigation,” 24 pages.
Foam Rubber vs. Sponge Rubber: Know the Difference, Accurate Rubber Corporation (Feb. 8, 2021), https://www.accuraterubber.com/foam-vs-sponge-rubber-comparison/ (p. 1-2). (Year: 2021).

* cited by examiner

BATTERY CELL ARRAY TO PACK THERMAL RUNAWAY GAS VENTING SYSTEM USING MID PACK CHANNEL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Ventilating the battery cells of a battery pack for an electric vehicle is known in the art. The vent system must remain open for gas to traverse during a thermal event so that the gas is able to reach the pack's vent port. The rest of the pack is commonly filled with potting resin (foamed or non-foamed) for electrical isolation, structural performance and thermal insulation. Controlling the position of the potting is challenging. The variability of foam expansion makes the baseline system incompatible with foam potting.

The present disclosure relates to a battery cell array to pack thermal runaway gas venting system using mid pack channel system.

SUMMARY

The main objective of the present disclosure is to create a closed volume for the thermal runaway gas vent system. This closed volume cannot be blocked by potting during manufacturing.

According to an aspect of the present disclosure, a battery pack for a vehicle includes a housing including at least one pack vent between an interior and an exterior of the housing. A plurality of battery cells are disposed within the housing. A channel system includes channel arrays positioned in connection with vents on each of the plurality of battery cells and the channel arrays are in connection with a master channel that communicates with the at least one pack vent, wherein the channel system is enclosed from the rest of the volume of the pack.

According to a further aspect, the housing contains a potting material encapsulating the channel system.

According to a further aspect, the potting material is one of a foam, and a non-foamed polymeric resin.

According to a further aspect, the channel system is isolated to prevent potting from entering the vent system.

According to a further aspect, the channel array includes a plurality of battery cell engagement panels and a plurality of tray panels.

According to a further aspect, a gap between the adjacent battery cell engagement panels and the adjacent tray panels is less than half a thickness of the battery cell engagement panels and the tray panels, respectively.

According to a further aspect, the master channel includes multiple master channels.

According to a further aspect, the at least one pack vent includes multiple pack vents.

According to a further aspect, the housing includes a plurality of submodules and each submodule includes a channel array.

According to a further aspect, the channel array include ribs defining a plurality of channels under the cells that run either longitudinal or transverse to the vehicle and are connected by a series of openings in the ribs.

According to a further aspect, a thermal runaway sensor is in the master channel.

According to a further aspect, the master channel connects with the channel arrays along a face of the array.

According to a further aspect, the master channel runs down a center of the housing dividing separate sections of the housing.

According to a further aspect, the master channel is formed by a hose that connects the channel array to the at least one pack vent.

According to a further aspect, the master channel is formed directly in the potting such that there is no separate wall material.

According to a further aspect, the master channel contains a series of spark arrestors with decreasing hole size as the gas travels towards the pack vent.

According to a further aspect, at least one cooling element is disposed along the master channel.

According to a further aspect, the channel system includes a plurality of battery cell engagement panels and a plurality of tray panels that include ribs defining the channel arrays and a plurality of apertures in the battery cell engagement panels and in communication with vents in the plurality of battery cells.

According to a further aspect, a breakable sheet is disposed between the plurality of battery cell engagement panels and the plurality of tray panels.

According to another aspect, a battery pack for a vehicle includes a housing including at least one vent between an interior and an exterior of the housing. a plurality of battery cells are disposed within the housing. A channel system includes channel arrays positioned in connection with vents on each of the plurality of battery cells and the channel arrays are in connection with a master channel that communicates with the at least one pack vent of the housing. At least one cooling element is adjacent to the master channel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
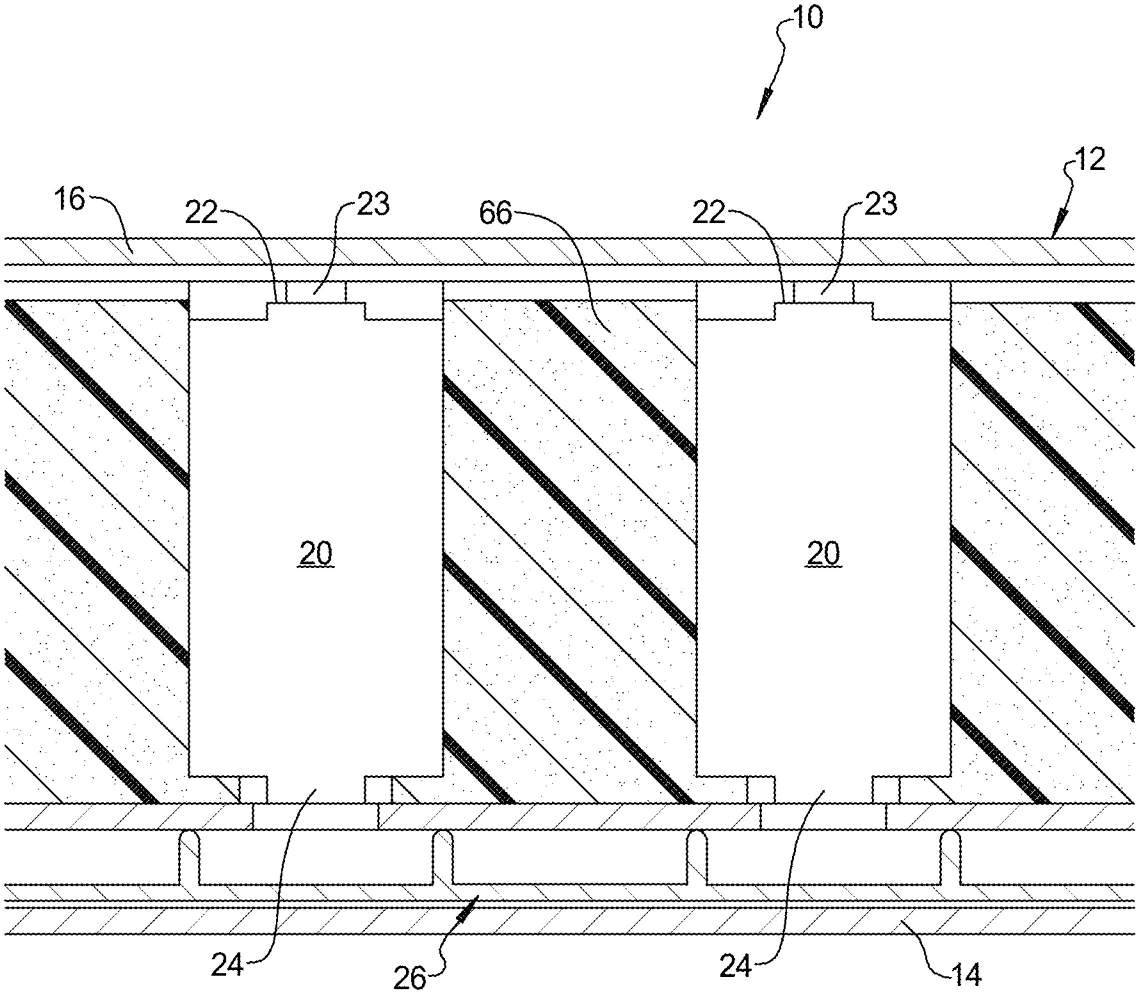
FIG. 1 is a partial cross-sectional view of a battery pack having a vent system according to the principles of the present disclosure.
Figure 2:
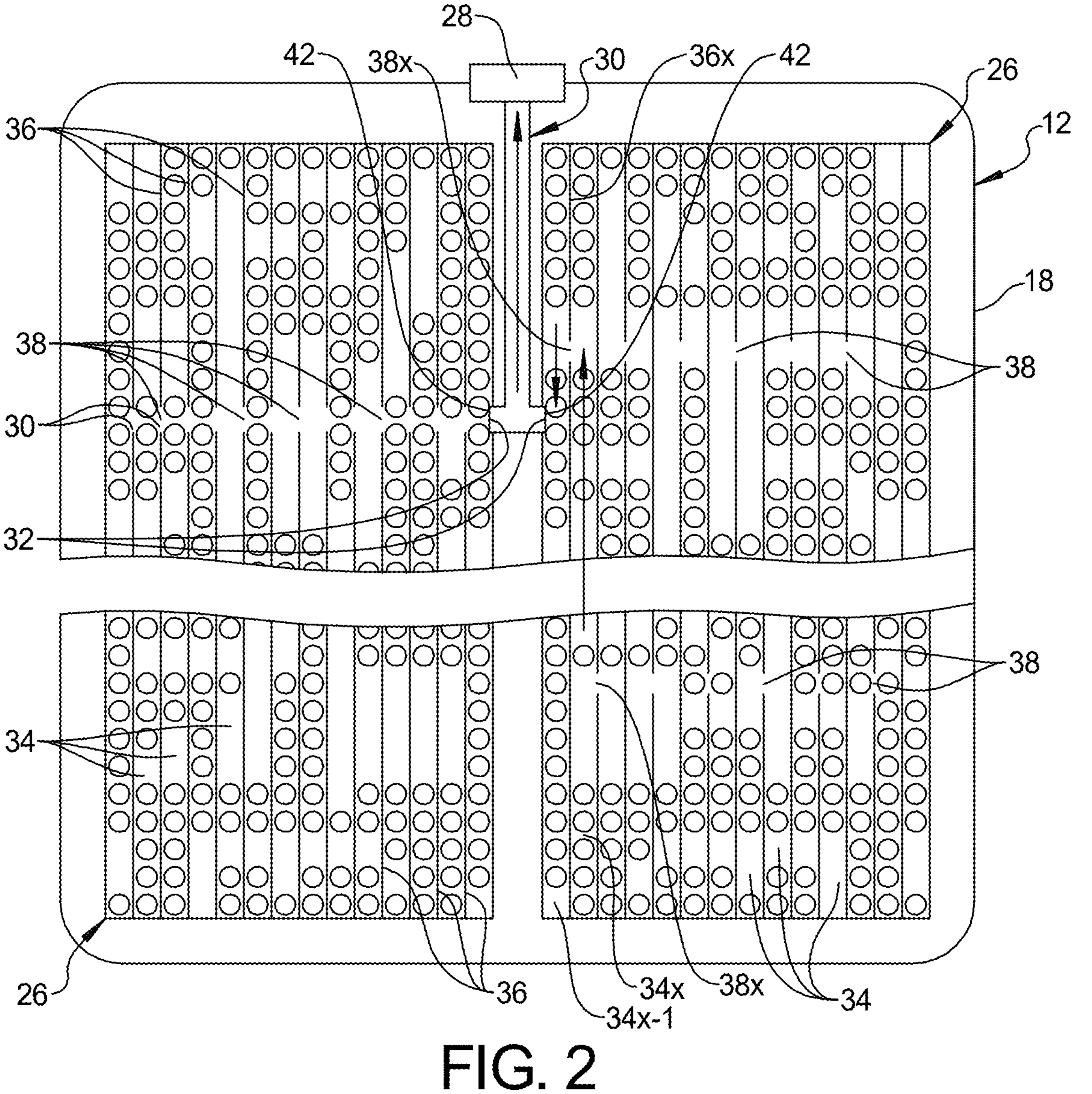
FIG. 2 is a schematic view of a battery pack having a vent system with a channel array connecting each battery cell to a master channel.

With reference to FIG. 1, a battery pack 10 is schematically shown including a housing 12 having a bottom shear plate 14, a top shear plate 16 and a sidewall enclosure 18 (see FIG. 2). A plurality of battery cells 20 are disposed within the housing 12. The battery cells 20 each include electric terminals 22 for connection to a bus bar or other system 23 for electrical connection. The battery cells 20 each include a vent 24 in communication with a channel array 26.

As shown in FIG. 2, the channel array 26 connects the vent 24 of each of the battery cells 20 to a pack vent 28 provided in the housing 12 via a master channel 30 that connects an outlet port 32 of the channel array 26 with the pack vent 28. The channel array 26 includes a plurality of channels 34 separated by a series of ribs 36 that include openings 38 for communicating the vent 24 of each battery cell 20 with the outlet port 32 of the channel array 26.

By way of example, as shown in FIG. 2, the vent from the battery cell 20*x* communicates through a channel 34*x*, through opening 38*x* in rib 36*x* and to channel 34*x*-1 to the outlet port 32 as indicated by the direction arrows. As shown in FIG. 2, the ribs 36 include openings 38 to allow the vent 24 of each battery cell 20 to communicate through and across the channels 34 to the outlet port 32. The channels 34 and the openings 38 can be provided with numerous alternative arrangements for communicating gasses from the battery cells 20 to the outlet port 32. The system easily enables a longer gas travel path to enable the gas temperature to be reduced prior to the gas exiting the pack.

Figure 3:
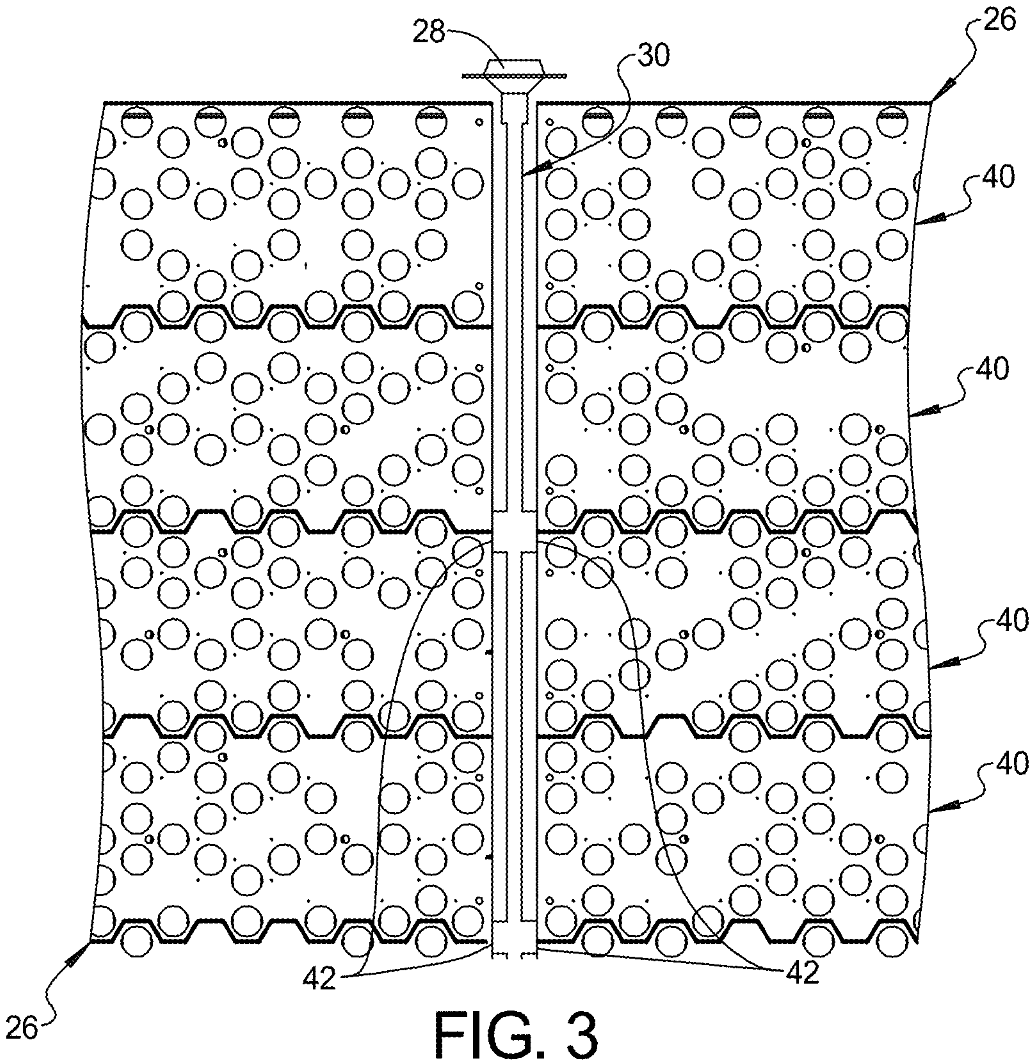
FIG. 3 is a detailed view of the connection between the channel array and the master channel.

With reference to FIG. 3, a plan view of the channel array 26 is shown being made up of interlocking channel panels 40 that interlock with adjacent channel panels 40 and communicate each battery cell to one of multiple outlet ports 32 that communicate with the master channel 30 at multiple inlet ports 42 along the master channel 30.

Figure 4:
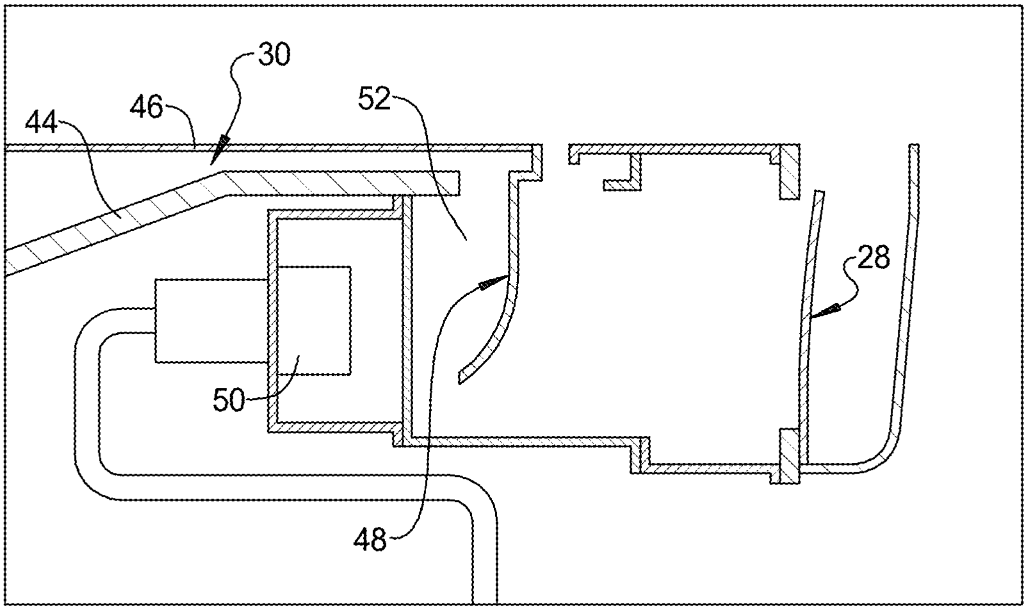
FIG. 4 is a perspective cut-away view of the master channel of the battery pack vent system.

With reference to FIG. 4, the master channel 30 can be formed by a bottom part 44 and a top part 46 that engage one another to define the master channel 30 therebetween and communicate with an optional gas deflector 48 that can direct the vented gasses toward a thermal sensor 50 in a vent gas path 52. The pack vent 28 is disposed at an end of the vent gas path 52. The master channel 30 may be circular or non-circular in cross section. The master channel 30 may be a hose with a defined wall material, or may be molded into the potting using a tool. The tool could be a rigid, reusable mold or a removable flexible inflatable bladder.

Figure 5:
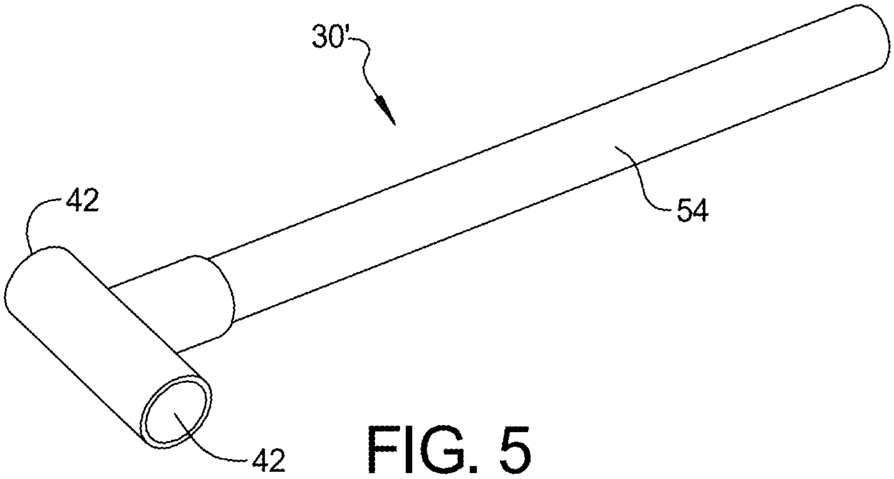
FIG. 5 is a perspective view of an alternative tubing forming the master channel of the battery pack vent system.

With reference to FIG. 5, the master channel 30' can be made from a tube structure 54 that can have a circular, oval, rectangular, square or other cross-section. The tube structure includes a pair of inlet ports 42 that connect to the channel arrays 26.

Figure 6:
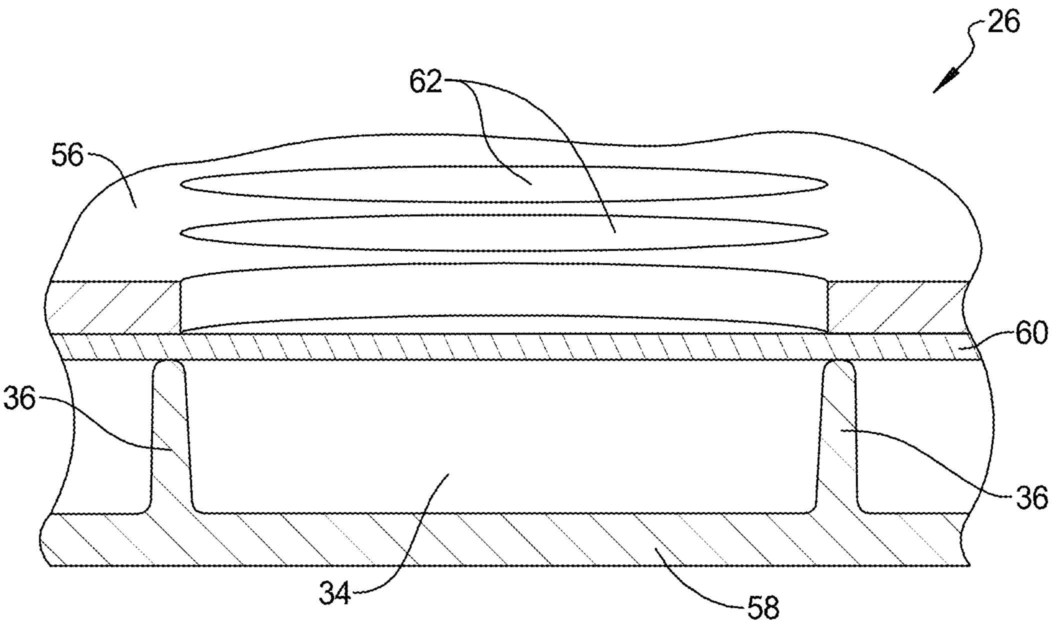
FIG. 6 is a cross-sectional view of the cell tray of the channel array.
Figure 7:
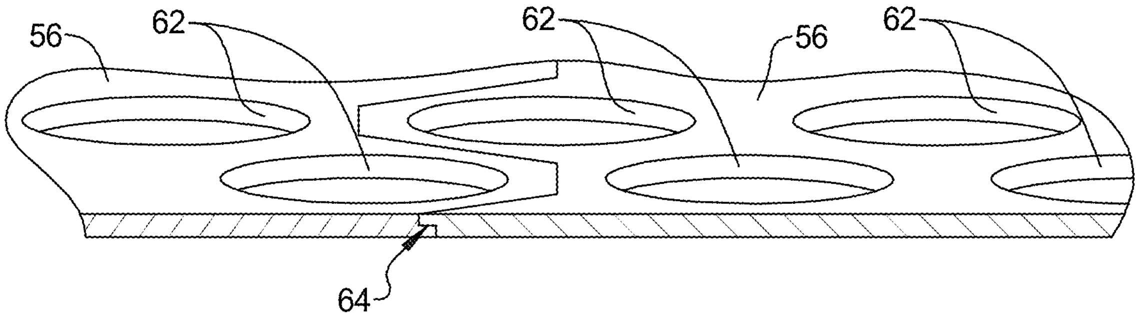
FIG. 7 is a cross sectional view of the interface between adjacent cell trays.

With reference to FIG. 6-7, the channel array 26 is shown including battery cell engagement panels 56 and tray panels 58 that combine to define the channels 34 therebetween. The battery cell engagement panels 56 and the tray panels 58 can be formed as injection molded parts. A breakable sheet 60 may be added under the battery cell engagement panels 56 to thermally shield the rest of the cells during a thermal runaway event of the single cell. Sealant may be added to help hold the breakable sheet 60 in place. The breakable sheet 60 may be made from mica, phenolic, or another thermally resilient but brittle material that is breakable in response to a thermal event of a battery cell 20. The battery cell engagement panels 56 include apertures 62 that communicate with a vent opening of each battery cell 20. One of the battery cell engagement panels 56 and the tray panels 58 include the ribs 36 for defining the channels 34 of the channel array 26 that communicate each aperture 62 to the outlet port 32. The ribs 36 can be sealed to the opposing one of the battery cell engagement panel 56 or the tray panel 58 to provide sealed channels 34. In addition, as shown in FIG. 7, a scarf joint 64 is provided at an interface of the adjacent battery cell engagement panels 56. A gap between the scarf joint 64 is less than one half a thickness of the battery cell engagement panel 56 (generally less than 2-3 mm). The battery pack 10 is at least partially filled with potting 66, as shown in FIG. 1. The scarf joint 64 prevents the potting 66 from entering the cell channel array 26. The joint 64 may be further sealed with a sealant or tape.

The entire vent system is sealed such that the potting 66 cannot enter the system during manufacture. With the channels 34 being sealed, the foam or non-foam potting 66 can be filled to a point that it contacts the upper and lower shear plates 14, 16, enabling upper-to-lower shear plate connection through the potting 66. Once the potting is in place the vent system is sealed sufficiently to contain gas. In another variant, each section of cells could have its own or multiple master channels 30 connected to more than one separate pack vents 28.

Figure 8:
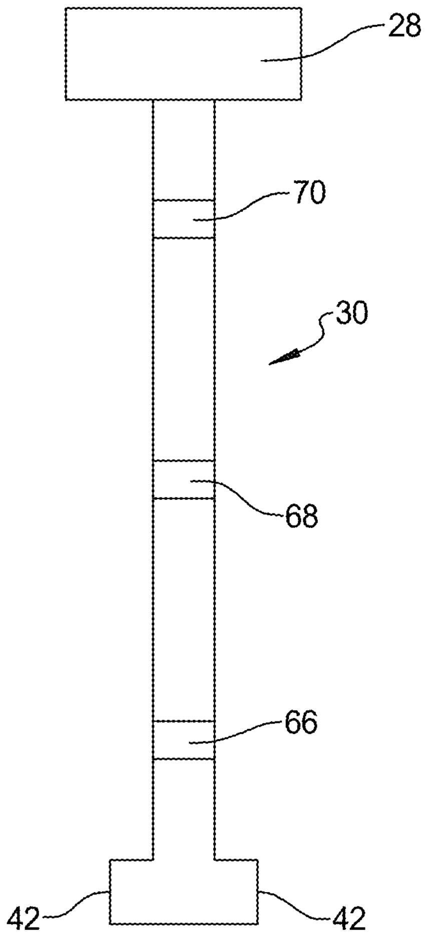
FIG. 8 is a schematic view of the spark arrestors disposed along the master vent channel.

With reference to FIG. 8, the master channel 30 is shown including inlet ports 42 that are configured to be connected to the outlet ports 32 of the channel arrays 26. The master channel 30 can include a series of spark arrestors 66, 68, 70 that can filter out sparks passing through the master channel. The spark arrestors can be formed as a mesh having progressively smaller holes along the flow direction. The transition from large spark arrestors to refined spark arrestors give improved particle filtering which results in higher vent gas auto-ignition temperature s external to the pack providing increased allowable temperature of vent gas safely exiting the rechargeable energy storage system. The separation of spark arrestors from the pack vent 28 enable less restriction through the pack vent 28, thus providing an increased flow rate, which results in potential reduction of a size or a number of pack level vents required.

Figure 9:
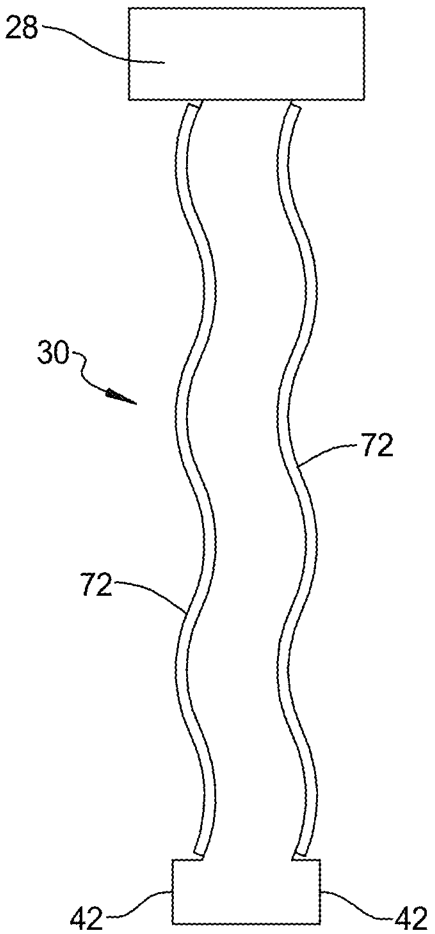
FIG. 9 is a schematic view of cooling ribbons disposed along the master vent channel.

With reference to FIG. 9, the master channel 30 can be cooled using a cooling element such as a cooling ribbon 72 facing the master channel 30 to reduce the temperature of the gasses expelled from the pack vent 28.

The battery pack 10 includes a closed ventilation system for transporting and reducing the temperature of discharged gas from a cell undergoing thermal runaway. The purpose of creating this closed system is to ensure potting 66 used to encapsulate the battery cells 20 does not enter the vent system during manufacturing of the battery pack 10, as well as keep hot vent gases contained and away from the remaining battery cells 20.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

What is claimed is:

1. A battery pack for a vehicle, comprising:

a housing including at least one pack vent between an interior and an exterior of the housing;

a plurality of battery cells disposed within the housing in a plurality of adjacent rows; and a channel system including channel arrays including a plurality of separate channels positioned in connection with vents on each of the plurality of battery cells in a corresponding one of the plurality of adjacent rows and the plurality of separate channels are each in connection with a master channel that communicates with the at least one pack vent of the housing, wherein the channel system is enclosed from a rest of a volume of the battery pack.

2. The battery pack for a vehicle according to claim 1, wherein the housing contains a potting material encapsulating the channel system.

3. The battery pack for a vehicle according to claim 2, wherein the potting material is one of a foam, or a non-foamed polymeric resin.

4. The battery pack for a vehicle according to claim 1, wherein the channel system is isolated to prevent potting from entering the vents on each of the plurality of battery cells.

5. The battery pack for a vehicle according to claim 1, wherein the channel arrays include a plurality of battery cell engagement panels and a plurality of tray panels.

6. The battery pack for a vehicle according to claim 5, wherein a gap between adjacent ones of the plurality of battery cell engagement panels and adjacent ones of the plurality of tray panels is less than half a thickness of the plurality of battery cell engagement panels and the plurality of tray panels, respectively.

7. The battery pack for a vehicle according to claim 1, wherein the master channel includes multiple master channels.

8. The battery pack for a vehicle according to claim 1, wherein the at least one pack vent includes multiple pack vents.

9. The battery pack for a vehicle according to claim 1, wherein the housing includes a plurality of sub-modules and each sub-module includes a channel array.

10. The battery pack for a vehicle according to claim 1, wherein the channel arrays include ribs defining the plurality of separate channels under the plurality of battery cells that run either longitudinal or transverse to the vehicle and are connected by a series of openings in the ribs.

11. The battery pack for a vehicle according to claim 1, further comprising a thermal runaway sensor in the master channel.

12. The battery pack for a vehicle according to claim 1, wherein the master channel connects with the channel arrays along a face of the channel arrays.

13. The battery pack for a vehicle according to claim 1, wherein the master channel runs down a center of the housing dividing separate sections of the housing.

14. The battery pack for a vehicle according to claim 1, wherein the master channel is formed by a hose that connects the channel arrays to the at least one pack vent.

15. The battery pack for a vehicle according to claim 2, wherein the master channel is formed directly in the potting material such that there is no separate wall material.

16. The battery pack for a vehicle according to claim 1, wherein the master channel contains a series of spark arrestors with decreasing hole size as a gas travels towards the pack vent.

17. The battery pack for a vehicle according to claim 1, further comprising at least one cooling ribbon disposed along the master channel.

18. The battery pack for a vehicle according to claim 1, wherein the channel system includes a plurality of battery cell engagement panels and a plurality of tray panels that include ribs defining the channel arrays and a plurality of apertures in the plurality of battery cell engagement panels and in communication with vents in the plurality of battery cells.

19. The battery pack for a vehicle according to claim 18, further comprising a breakable sheet between the plurality of battery cell engagement panels and the plurality of tray panels.

20. A battery pack for a vehicle, comprising:

a housing including at least one vent between an interior and an exterior of the housing;

a plurality of battery cells disposed within the housing in a plurality of adjacent rows, a channel system including channel arrays including a plurality of separate channels positioned in connection with vents on each of the plurality of battery cells in a corresponding one of the plurality of adjacent rows and the plurality of separate channels are each in connection with a master channel that communicates with the at least one vent of the housing; and at least one cooling element adjacent to the master channel.

* * * * *